Dec. 21, 1965  W. C. SCHWEITZER  3,224,755
ANGULARLY ADJUSTABLE VISES
Filed May 27, 1963

WALTER C. SCHWEITZER
INVENTOR.

BY
LeRoy J. Leishman
AGENT

United States Patent Office 3,224,755
Patented Dec. 21, 1965

3,224,755
ANGULARLY ADJUSTABLE VISES
Walter C. Schweitzer, 3947 Redwood Ave.,
Los Angeles, Calif.
Filed May 27, 1963, Ser. No. 283,270
5 Claims. (Cl. 269—245)

The invention herein set forth pertains to vises and particularly to a vise whose jaws are angularly adjustable about a common axis while holding a work-piece therebetween.

Most vises are provided with opposed jaws, one of which is movable toward and from the other. Such vises make no provision for angularly adjusting such work pieces as may be held between them without releasing the jaws. Other vises have been especially made for holding the work in position while some operation is being performed thereon by a machine tool. Some of these vises embody an angularly movable bed for adjusting the jaws and the work angularly with respect to an axis that is close to the base and which does not pass through the work piece. Still other vises have been available that permit the work to be rotated about an axis passing between the jaws of the vise, but these have required that the grip of the jaws be released to permit the required angular adjustment to be made.

One of the objects of the present invention is to provide a vise that will permit the work to be rotated about an axis passing therethrough while the work is tightly gripped between the jaws of the vise.

Another object of the present invention is to provide a device having indicating means thereon to permit an angular adjustment of the work through a discreet angle.

An additional object of the present invention is the provision of means in a device of the type described that will permit one manually operable member to clamp the work between the jaws and another manually operable member to rotate the jaws and the work angularly about an axis passing through them.

Still another object is to provide means associated with one of the jaws whereby the angular movement of this jaw about an axis passing through the work may be measured with respect to a stationary indicating means.

Another object is to provide a device of the type described that will be economical to build and that will nevertheless be durable.

This invention possesses many other advantages and has other objects which may be made more clearly apparent from a consideration of one embodiment thereof. For this purpose, such an embodiment is shown in the drawings accompanying and forming a part of the present specification. This embodiment will now be described in detail, illustrating the general principles of the invention, but it is to be understood that this detailed description is not to be taken in a limiting sense, since the scope of this invention is best defined by the appended claims.

Figure 1:
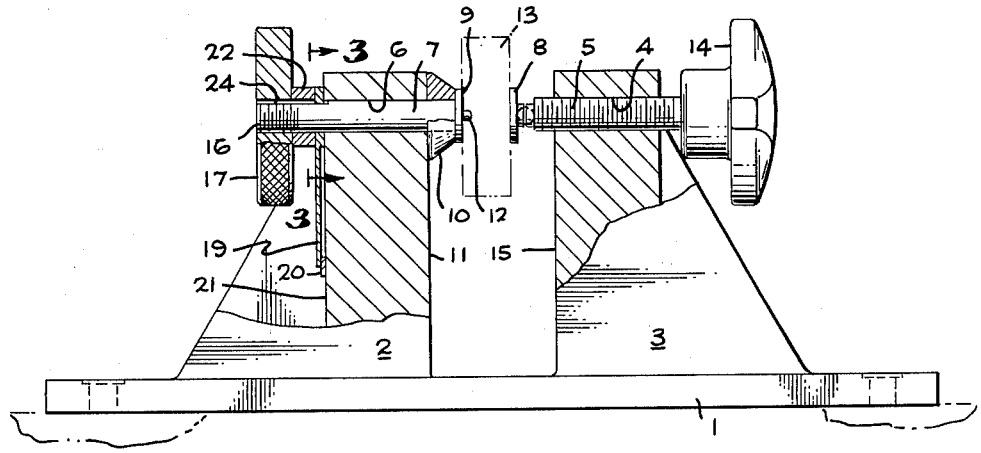
FIGURE 1 is a side elevation partly broken away of a vise embodying the present invention and showing in phantom a work piece gripped between the jaws.

The embodiment herein described and shown comprises a base 1 having two upright members 2 and 3 integral therewith or rigidly secured thereto. The upright 3 has an internally threaded hole 4 extending therethrough. I prefer that this hole be parallel to the base 1, but this is not essential. A threaded shaft 5 extends through the hole 4, this shaft being provided with male threads which are in screw-threaded engagement with female threads in the hole 4.

The upright 2 is also provided with a hole extending therethrough, this hole being axially aligned with the hole 4 in the upright 3. A second shaft 7 passes through the non-threaded hole 6, this second shaft, because of the axial alignment of the holes 4 and 6, being in axial alignment with the first-mentioned shaft 5.

A jaw or clamping member 8 is mounted on the end of the shaft 5 for rotatable movement with respect thereto. A clamping element 9 is rigidly secured against rotation on the outer end of the non-threaded shaft 7, and I prefer to interpose a thrust-bearing 10 between this element and the face 11 of the upright 2. A centering pin 12 is optionally carried on the clamping element 9, this pin being concentric with the axis of rotation of shaft 7. The pin 12 may be removable to accommodate work having no recess suitable for receiving the pin. The work piece 13 may be clamped between the jaws 8 and 9 by rotating the knob 14 in order to move the jaw 8 closer to or further from the face 15 of the upright 3. The work may thus be clamped firmly between the jaws.

The outer end 16 of shaft 7 is peripherally threaded to receive a handle, knob or lever 17, having a threaded recess extending transversely therein from at least one side, this side being the one that is closest to the upright 2. This recess may, of course, extend all the way through member 17 if appearance is not a factor. If this handle is of such shape that it may be grasped, I prefer that its periphery be knurled as shown in FIG. 1. Between the handle 17 and the upright 2, I mount an indicating device 19 upon the shaft 7 and key it thereto by any appropriate means, such as the mating flats 23 and 24, so that no angular movement is possible between the indicator and the shaft. On the outer surface 21 of the upright 2 I provide a stationary indicating means 20 for cooperation with the rotating indicating member 19. In the particular embodiment illustrated, member 19 is a pointer and the stationary indicating means that cooperates with the pointer 19 is a calibrated scale, which may be calibrated in degrees or in any other increments that may be desired.

Figure 2:
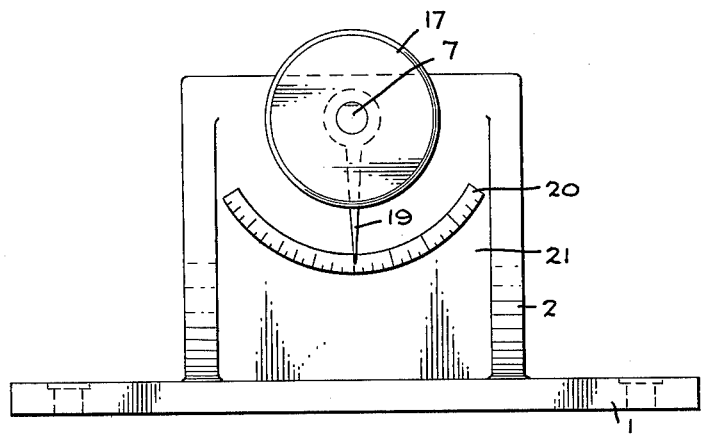
FIG. 2 is a left-end view of the device shown in FIG. 1.
Figure 3:
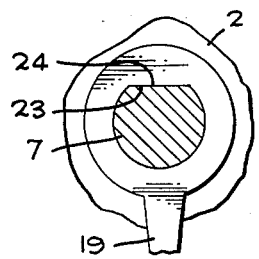
FIG. 3 is a section taken substantially on line 3—3 of FIG. 1.

As shown in FIG. 2, the scale 20 covers an angular distance of 90 degrees, but this may of course be reduced or extended for a full 360 degrees. Should the face 21 of the upright 2 be provided with a stationary indicator or pointer, the calibrated scale will of course be mounted on the shaft 7 and suitably secured thereto to prevent angular movement between the shaft and the scale.

Between the indicator 19 and the handle 17 I interpose a centrally apertured spacer 22 which is carried by the shaft 7, the spacer 22 being free to move axially at least for a short distance. The spacer 22 may be independent of the knob 17, or it may be a bead formed on member 17 or an annular ring connected thereto and having sufficient space between its inside walls and the shaft 7 to assure that there will be no binding between the two. It is essential of course that there be no shoulder on the shaft 7 between the knob 17 and the indicator 19 that could be engaged by the knob.

In the illustrative embodiment of my invention hereinbefore described, the rotation of knob 17 in a direction that will move it toward the work 13, brings the spacer 22 into engagement with the indicator 19 which is so keyed to the shaft 7 that no relative angular movement is possible between these members but so that the indicator 19 never reaches the right end of the keying means provided on the shaft 7. If the threads on shaft 7 and in the knob 17 are right-hand threads, the rotation of knob 17 to the right will bring the spacer 22 into engagement with the indicator 19 and move it into firm engagement against the surface 21 of the upright 2. This will lock the shaft 7 against angular movement, and inasmuch as the plate or jaw 9 is rigidly secured to the outer end of this shaft, no angular movement of the work 13 around the common axis of the shafts 5 and 7 is possible.

When it is desired to move the work 13 angularly about the axis of the two shafts, this can be done without releasing the firm grip of the jaws 8 and 9 upon the work. This is accomplished by rotating the knob 17 counter-clockwise to release the pressure of the spacer 22 against the surface 21, this pressure in the embodiment herein shown being of course transmitted by the member 19 from the spacer 22 to the portions of the face 21 that are in engagement with the indicator 19. Inasmuch as the thrust bearing 10 between the clamping element or jaw 9 and the upright 2 is a thrust-bearing, the work 13 may remain tightly clamped between the jaws 8 and 9 without interfering with the free rotary movement of the shaft 7 or of the jaw 8 which, as previously set forth, is rotatably mounted on shaft 5 for free angular movement with respect thereto. With the knob 17 thus backed away from the upright 2, these various parts are freely rotatable, and the indicator 19 may be moved angularly with respect to the indicator 20 to any relative angular position that may be desired. Since the indicator 19 is keyed for rotation with the shaft 7, the relative angular movement of member 19 with respect to the scale 20 effects a corresponding angular movement of the work 13. It is thus possible by means of my device to move the work 13 angularly so that holes may be drilled therein or surfaces milled thereon that will have any desired angular relationship with respect to each other.

Various modifications may of course be made from the illustrative embodiment of my invention hereinbefore described, and various elements may be omitted from the combination and replaced by other elements performing the same function as the ones omitted, or these functions plus others; and various parts may be added, altered, changed in position and transposed without departing from the broad spirit of my invention as succinctly set forth in the appended claims.

The inventor claims:

1. In a vise for holding work pieces rigidly or for angular movement about a fixed axis passing therethrough, a combination including: a base; first and second uprights carried by said base, said first upright having a threaded hole extending therethrough; a threaded shaft extending through said hole and in screw-threaded engagement therewith; said second upright having a non-threaded hole therethrough aligned with the hole in said first upright; a second shaft extending through said non-threaded hole; a work-engaging member pivotally mounted on the end of said first shaft that is closest to said second shaft; means carried by the other end of said first shaft whereby it may be rotated to vary the distance between said member and said first upright; a work-engaging element rigidly mounted on the end of said second shaft that is closest to said first shaft; a portion of said second shaft adjacent its other end having male threads thereon; a handle having an internally threaded, transversely-extending recess therein in threaded engagement with the threads on said second shaft; a spacer surrounding said second shaft between said handle and said second upright; said handle acting when rotated on the threads of said second shaft toward said second upright to lock said second shaft and said work-engaging element in adjusted angular position with respect to said uprights.

2. In a vise for holding work pieces between clamping members that are angularly adjustable about an axis passing therethrough, a combination including: a base; first and second uprights affixed to said base; an elongated, translationally movable member carried by said first upright; means associated with said translationally movable member and said first upright for holding said translationally movable member in adjusted longitudinal position with respect to said first upright; said second upright having a recess therethrough longitudinally aligned with said elongated member; a work-engaging member pivotally mounted on one end of said elongated member; a rotatable shaft extending through said recess; a work-engaging element rigidly mounted on the end of said shaft that is closest to said work engaging member; a portion of said shaft adjacent its other end having male threads thereon; a handle having an internally threaded, transversely-extending recess therein in threaded engagement with the threads on said shaft; and a spacer surrounding said shaft between said handle and said second upright; said handle acting when rotated on the threads of said shaft toward said second upright to press said spacer against said second upright and lock said shaft and said work-engaging element in adjusted angular position.

3. In a vise for holding work pieces between synchronously movable, angularly adjustable members, a combination including: a base; first and second uprights affixed to said base; an elongated, translationally movable member carried by said first upright; means associated with said translationally movable member and said first upright for holding said translationally movable member in adjusted longitudinal position with respect to said first upright; said second upright having a recess therethrough longitudinally aligned with said elongated member; a work-engaging member pivotally mounted on one end of said elongated member; a rotatable shaft extending through said recess; a work-engaging element rigidly mounted on the end of said shaft that is closest to said work engaging member; a portion of said shaft adjacent its other end having male threads thereon; a handle having an internally threaded, transversely-extending recess therein in threaded engagement with the threads on said shaft; means carried by said shaft and said second upright for indicating their relative angular positions; and a spacer surrounding said shaft between said handle and said second upright; said handle acting when rotated on the threads of said shaft toward said second upright to press said spacer against said second upright and lock said shaft and said work-engaging element in adjusted angular position.

4. In a vise for holding work pieces between clamping members that are angularly adjustable about an axis passing therethrough, a combination including: a base; first and second uprights affixed to said base; an elongated, translationally movable member carried by said first upright; means associated with translationally movable member and said first upright for holding said translationally movable member in adjusted longitudinal position with respect to said first upright; said second upright having a recess therethrough longitudinally aligned with said elongated member; a work-engaging member pivotally mounted on one end of said elongated member; a rotatable shaft extending through said recess; a work-engaging element rigidly mounted on the end of said shaft that is closest to said work engaging member; a portion of said shaft adjacent its other end having male threads thereon; a handle having an internally threaded, transversely-extending recess therein in threaded engagement with the threads on said shaft; a spacer surrounding said shaft between said handle and said second upright; a calibrated arcuate scale carried by said second upright, said scale being concentric with said shaft; and a pointer carried by said shaft for angular movement therewith; and a spacer surrounding said shaft between said handle and said second upright; said handle acting when rotated on the threads of said shaft toward said second upright to press said spacer toward said second upright and lock said shaft and said work-engaging element in adjusted angular position.

5. In a vise for holding work pieces between coordinated angularly adjustable members, a combination including: a base; first and second uprights affixed to said base; an elongated, translationally movable member carried by said first upright; means associated with said translationally movable member and said first upright for holding said translationally movable member in adjusted longitudinal position with respect to said first upright; said second upright having a recess therethrough longitudinally aligned with said elongated member; a work-engaging member pivotally mounted on one end of said elongated member; a rotatable shaft extending through said recess; a work-engaging element rigidly mounted on the end of said shaft that is closest to said work engaging member; a portion of said shaft adjacent its other end having male threads thereon; a handle having an internally threaded, transversely extending recess therein in threaded engagement with the threads on said shaft; a keyway on said shaft extending at least from a position thereon that is within said spacer to a position that is within said recess; a pair of cooperating instrumentalities for indicating the angular position of said shaft with respect to said second upright, one of said instrumentalities carried by said shaft and keyed thereto by means of said keyway for rotation therewith, and the other instrumentality mounted on said second upright; and a spacer surrounding said shaft between said handle and said second upright; said handle acting when rotated on the threads of said shaft toward said second upright to press said spacer toward said second upright and lock said shaft and said work-engaging element in adjusted angular position.

References Cited by the Examiner
UNITED STATES PATENTS

| | | | |
|---|---|---|---|
| 2,643,557 | 6/1953 | Grove | 269—59 XR |
| 2,881,667 | 4/1959 | Ebert | 269—265 XR |

ROBERT C. RIORDON, *Primary Examiner.*